(12) United States Patent
Ooi

(10) Patent No.: US 11,442,723 B2
(45) Date of Patent: Sep. 13, 2022

(54) PROGRAMMING SUPPORT DEVICE, PROGRAMMING SUPPORT SYSTEM, AND PROGRAMMING SUPPORT METHOD

(71) Applicant: FANUC CORPORATION, Yamanashi (JP)

(72) Inventor: Kouhei Ooi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 37 days.

(21) Appl. No.: 17/037,672

(22) Filed: Sep. 30, 2020

(65) Prior Publication Data
US 2021/0117186 A1 Apr. 22, 2021

(30) Foreign Application Priority Data
Oct. 18, 2019 (JP) .............................. JP2019-190878

(51) Int. Cl.
*G06F 9/44* (2018.01)
*G06F 8/73* (2018.01)
*G06F 8/75* (2018.01)

(52) U.S. Cl.
CPC . *G06F 8/73* (2013.01); *G06F 8/75* (2013.01)

(58) Field of Classification Search
CPC .................................... G06F 8/73; G06F 8/75

USPC ................. 717/106–107, 120–121, 124, 135
See application file for complete search history.

(56) References Cited

U.S. PATENT DOCUMENTS 9,360,861 B2 * 6/2016 Hahn ................. G05B 19/4069

FOREIGN PATENT DOCUMENTS

JP H5113818 A 5/1993

OTHER PUBLICATIONS

Siemens, "Sinumerik 808D Programming and Operating Procedures for Turning", 2013, Training manual, Siemens AG, 118 pages. (Year: 2013).*
Nair et al., "ACAM: A CNC Simulation Software for Effective Learning", 2018, Elsevier Ltd., pp. 823-830. (Year: 2018).*

* cited by examiner

*Primary Examiner* — Ted T. Vo
(74) *Attorney, Agent, or Firm* — Hauptman Ham, LLP

(57) ABSTRACT

The programing support system creates programing support data. The programing support system analyzes a program for simulating and determines the call relationship of the program on the basis of the analysis result and a call time and an execution time on the basis of the analysis result and simulation result. The programing support system displays a programing support screen which visually express the programing support data.

15 Claims, 10 Drawing Sheets

FIG. 3

| ID | COMMENTS |
|----|----------|
| 1 | GROOVING |
| 2 | ROUGHING |
| 3 | FINISHING |
| 4 | DRILLING |
| 5 | BORING |
| 6 | DRILLING |
| 7 | TAPPING |
| 8 | ... |

FIG. 10

| DEVICE:CNC_MEM (CURRENT FOLDER:/USER/PATH1/) | | |
|---|---|---|
| PROGRAM NAME | CAPACITY | CREATION TIME |
| O2001 | 1[KBYTE] | 2019/07/09 19:17:12 |
| O3000 | 3[KBYTE] | 2019/07/09 19:17:12 |
| O3001 | 1[KBYTE] | 2019/07/09 19:17:12 |
| O3002 | 1[KBYTE] | 2019/07/11 15:21:48 |
| O9001 | 1[KBYTE] | 2019/07/10 14:12:50 |
| O9002 | 1[KBYTE] | 2019/07/10 14:13:28 |
| O9003 | 1[KBYTE] | 2019/07/10 14:14:24 |
| O9201 | 1[KBYTE] | 2019/07/10 14:15:14 |
| O9202 | 1[KBYTE] | 2019/07/11 16:15:24 |
| O4400 | 1[KBYTE] | 2019/07/09 19:17:14 |
| O4401 | 1[KBYTE] | 2019/07/09 19:17:14 |
| O4402 | 1[KBYTE] | 2019/07/09 19:17:12 |

PROGRAMING SUPPORT DEVICE, PROGRAMING SUPPORT SYSTEM, AND PROGRAMING SUPPORT METHOD

RELATED APPLICATIONS

The present application claims priority to Japanese Patent Application Number 2019-190878 filed Oct. 18, 2019, the disclosure of which is hereby incorporated by reference herein in its entirety.

BACKGROUND OF THE INVENTION

1. Field of the Invention

The present invention relates to a programing support device, a programing support system, and a programing support method that support creation of a program that controls a machine.

2. Description of the Related Art

In the field of industrial machines such as machine tools, simulation is common to check whether programs work correctly. Programmers perform the debugging of the program while confirming the simulation result.

Programs are described in files. Files in which programs are described (hereinafter referred to as program files) are managed for each folder. FIG. 10 is an example of a screen displaying a list of program files. On this screen, information about a simulation target is listed. The name of the actual machine (here, a numerical controller) is displayed in the "Device" column, the path of the current folder is displayed in the "Current Folder" column, and the program name, capacity, and creation time included in the current folder are listed. On such a screen, it is possible to confirm information regarding the file or folder in which the program is stored, such as the path to the program currently being viewed.

The program has a multiple structure in which a program calls other programs. Individual programs are executed, while the main program calls a subprogram and the subprogram calls a subprogram, and finally the processing returns to the main program and a series of processing ends.

On the conventional screen, multiple structure of the program is difficult to visually recognize.

There is also a numerical controller that displays the multiple structure of a multiple program in a tree structure. This numerical controller displays, in a tree structure, the multiple structure of program with a subprogram called by the main program, a subprogram called by the subprogram, a subprogram further called by the subprogram, and so on. Refer to JP H5-113818 A, for example.

While programing, a programmer should remove bugs from the program. To find bugs, programs are simulated, and bugs in the program are found and corrected. In order to find bugs in the program, it is very important to understand the program structure.

SUMMARY OF THE INVENTION

In the field of industrial machinery, there is a demand for a technology that makes clear the relationship in programs and supports creation of the program.

A programing support device of an aspect of the present disclosure is a programing support device for an industrial machine that executes a plurality of programs having a call relationship and performs a specific operation, the programing support device including: a program analysis unit that analyzes the plurality of programs; a simulation unit that simulates an operation of the industrial machine in accordance with an analysis result by the program analysis unit; a call relationship determination unit that determines a call relationship of programs being simulated; a call time determination unit that determines a call time of programs being simulated; and a programing support data creation unit that creates programing support data in which the call relationship of the programs determined by the call relationship determination unit and the call time of the programs determined by the call time determination unit are associated.

A programing support system of another aspect of the present disclosure is a programing support system for an industrial machine that executes a plurality of programs having a call relationship and performs specific processing, the programing support system including: a program analysis unit that analyzes the plurality of programs; a simulation unit that simulates an operation of the industrial machine in accordance with the analysis result by the program analysis unit; a call relationship determination unit that determines a call relationship of programs being simulated; a call time calculation unit that calculates a call time of programs being simulated; and a programing support data creation unit that creates programing support data in which the call relationship of the programs determined by the call relationship determination unit and the call time of the programs calculated by the call time calculation unit are associated.

A programing support method of another aspect of the present disclosure is a programing support method for an industrial machine that executes a plurality of programs having a call relationship and performs specific processing, the programing support method including: analyzing the plurality of programs; performing simulation of an operation of the industrial machine in accordance with the analysis result by the programs; determining a call relationship of programs being simulated; calculating a call time of programs being simulated; creating programing support data in which the call relationship of the programs and the call time of the programs are associated; on the basis of the programing support data, along a time axis set on a predetermined screen, creating a programing support screen that indicates the call relationship of the programs, the call time of the programs, and an execution time of the programs; and displaying the programing support screen on the predetermined screen.

BRIEF DESCRIPTION OF THE DRAWINGS

FIG. 3 is a view illustrating an example of a comment record;

FIG. 10 is an example of a conventional screen that displays a list of programs.

DETAILED DESCRIPTION OF THE PREFERRED EMBODIMENTS

Figure 1:
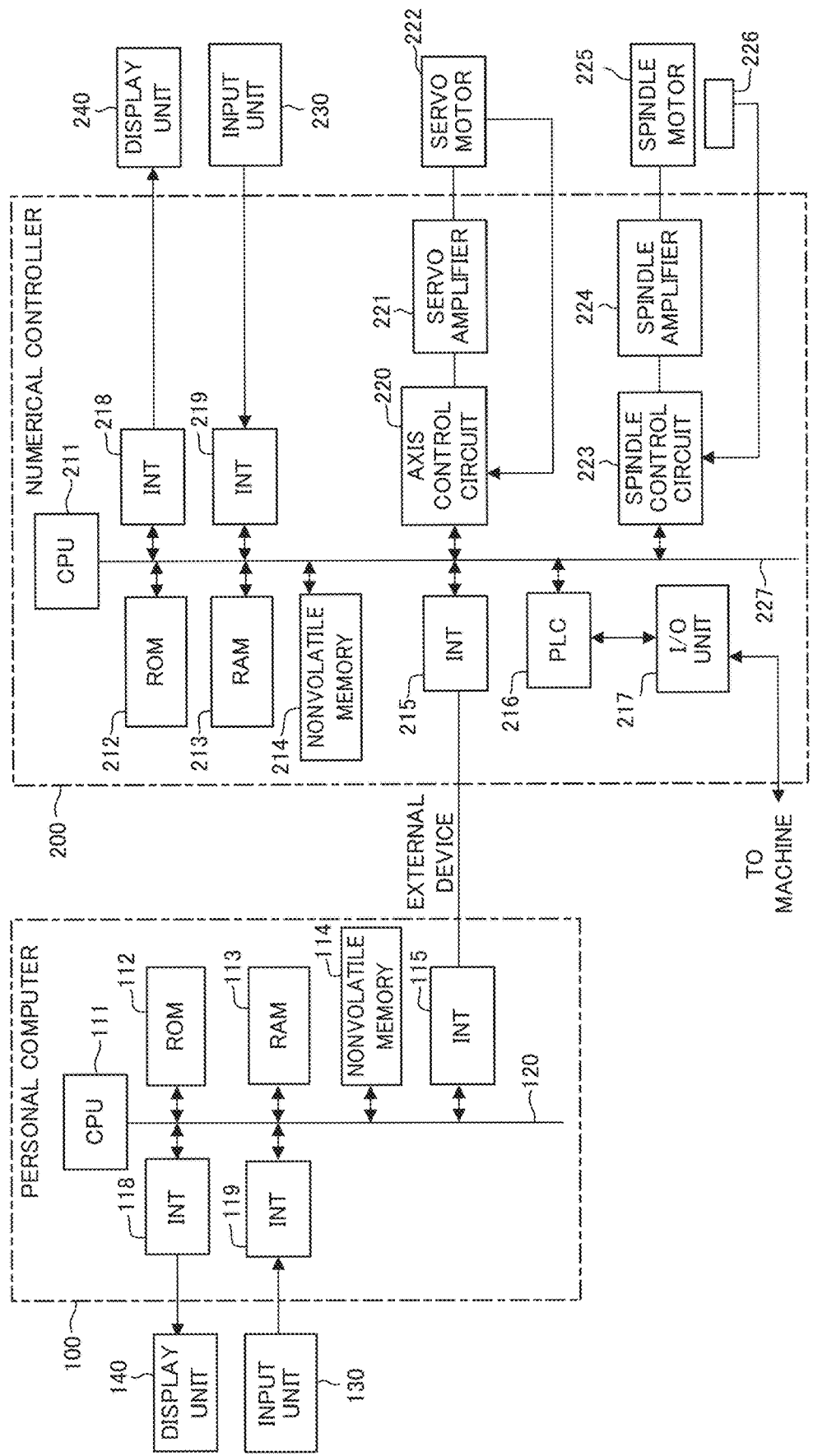
FIG. 1 is a hardware configuration diagram of a personal computer and a numerical controller of an embodiment.

A detailed description will hereinafter be given of a hardware configuration of a personal computer 100 and a numerical controller 200 in which a programing support system 300 of the present disclosure is implemented with consultation of FIG. 1.

The personal computer 100 includes a CPU 111, a ROM 112, a RAM 113, a nonvolatile memory 114, interfaces (INT) 115, 118, and 119, a display unit 140, and an input unit 130.

The CPU 111 is a processor that controls the personal computer 100. The CPU 111 reads, via a bus 120, a system program stored in the ROM 112, and controls the entire personal computer 100 in accordance with the system program. The RAM 113 temporarily stores temporary calculation data, display data, various data having been input by an operator via the input unit 130, and the like.

The nonvolatile memory 114 is configured as a memory that retains a storage state even when the power of the personal computer 100 is turned off. The nonvolatile memory 114 stores a program having been read from an external device via the interface 115, a program having been input via the input unit 130, and various data having been acquired from each unit of the personal computer 100, the numerical controller 200, and the like (such as data indicating the operation state of the numerical controller 200). The programs and various data stored in the nonvolatile memory 114 may be developed in the RAM 113 at the time of execution/use. In addition, a programing support program and a system program according to the present disclosure are written in the ROM 112.

The interface 115 is an interface for connecting the personal computer 100 with an external device such as an adapter. Programs and various data are read from the external device. In addition, various data edited in the personal computer 100 can be stored in an external storage unit via an external device. The programing support program described later may also be stored in one or a plurality of external storage units instead of the ROM 112 in the personal computer 100 and read from the outside.

On the display unit 140, data having been read into the memory and data having been obtained as a result of execution of a program or the like are output and displayed via the interface 118. In addition, the input unit 130 constituted with a keyboard, a mouse, and the like passes the user input to the CPU 111 via the interface 119.

The hardware configuration of the numerical controller 200 will be described next. A CPU 211 included in the numerical controller 200 according to the present embodiment is a processor that controls the numerical controller 200. The CPU 211 reads a system program stored in a ROM 212 via a bus 227, and controls the entire numerical controller 200 in accordance with the system program. A RAM 213 temporarily stores temporary calculation data, display data, various data having been input by the operator via an input unit not illustrated, and the like.

A nonvolatile memory 214 is constituted with, for example, a memory backed up by a battery not illustrated, a solid state drive (SSD), or the like. The nonvolatile memory 214 retains a storage state even when the power of the numerical controller 200 is turned off. The nonvolatile memory 214 stores a program having been read from an external device via an interface 215, a program having been input via an input unit 230, and various data having been acquired from each unit of the numerical controller 200, an industrial machine, and the like (such as data indicating the operation state of each axis acquired from the industrial machine). The programs and various data stored in the nonvolatile memory 214 may be developed in the RAM 213 at the time of execution/use. In addition, various system programs such as a known analysis program are written in advance in the ROM 212.

The interface 215 connects the numerical controller 200 and the personal computer 100, an external device. Programs and various data are read from the personal computer 100. In addition, programs, various data, and the like edited in the numerical controller 200 can be passed to the personal computer 100 via the interface. A programmable logic controller (PLC) 216 executes a sequence program incorporated in the numerical controller 200. The PLC performs and controls input and output of signals via an I/O unit 217 between an industrial machine and a device such as a sensor attached to the industrial machine.

On a display unit 240, data having been read into the memory and data having been obtained as a result of execution of a program or the like are output and displayed via an interface 218. The input unit 230, which is constituted with an MDI, an operation panel, a touch screen, and the like, passes a command, data, and the like input by the worker to the CPU 211 via an interface 219.

Upon receiving an axis movement command amount from the CPU 211, an axis control circuit 220 for controlling each axis of an industrial machine outputs an axis command to a servo amplifier 221. Upon receiving this command, the servo amplifier 221 drives a servo motor 222 that moves an axis included in the industrial machine. The servo motor 222 of the axis incorporates a position/speed detector. The position/speed detector feeds back a position/speed feedback signal to the axis control circuit 220 and the servo motor 222 performs feedback control of the position and speed.

A spindle control circuit 223 receives a main axis rotation command and outputs a spindle speed signal to a spindle amplifier 224. Upon receiving this spindle speed signal, the spindle amplifier 224 rotates a spindle motor 225 of the main axis at a rotation speed instructed by the command and drives a work axis. A position coder 226 is coupled to the spindle motor 225, the position coder 226 outputs a feedback pulse, and the feedback pulse is read by the CPU 211.

Figure 2:
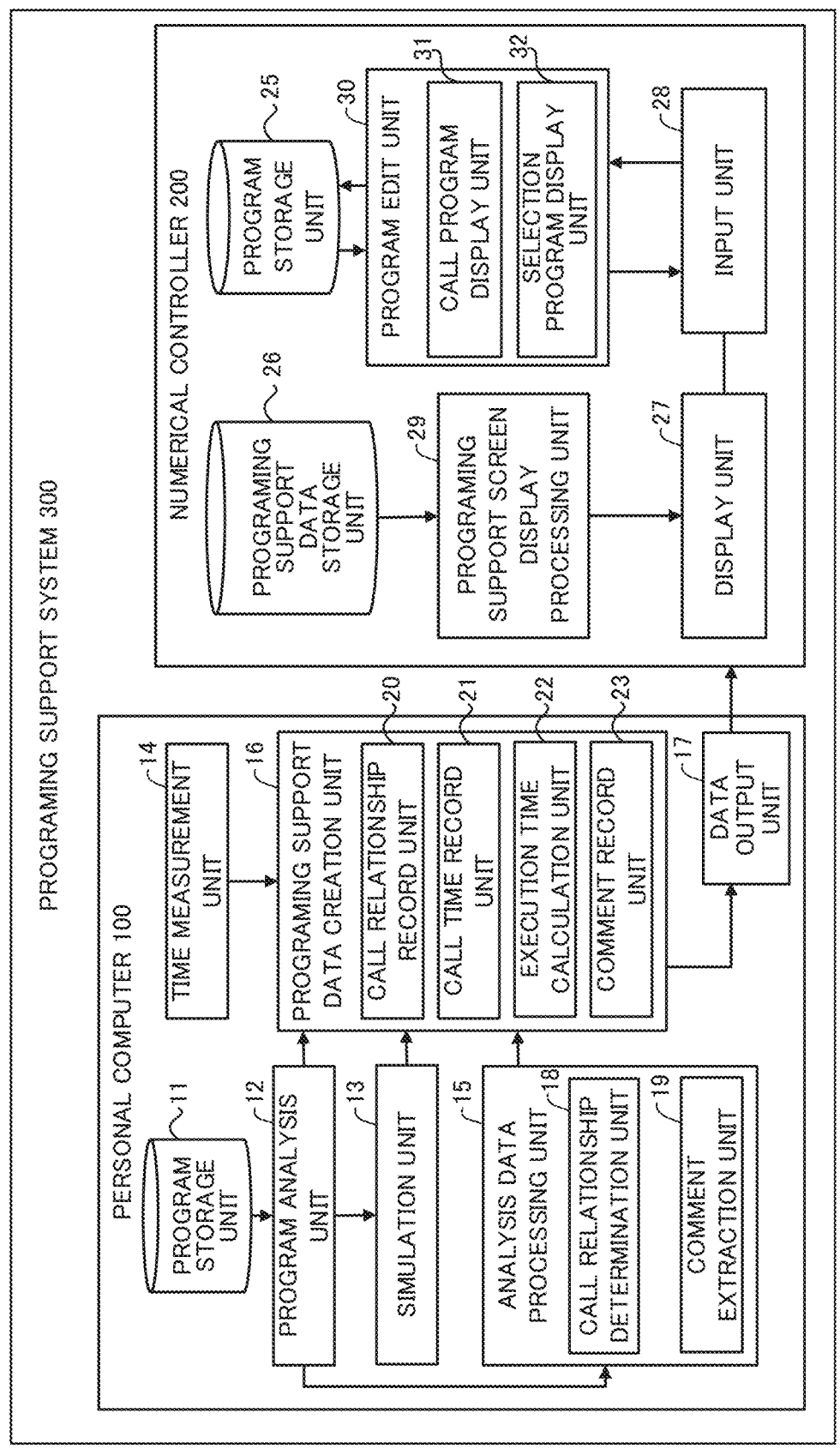
FIG. 2 is a block diagram of a programing support system of an embodiment.

FIG. 2 is a block diagram of the programing support system 300 of an embodiment of the present disclosure. The programing support system 300 is constituted with the personal computer 100 that performs simulation and creates programing support data, and the numerical controller 200 that displays a programing support screen.

The personal computer 100 has a program storage unit 11 that stores a program, a program analysis unit 12 that analyzes the program, a simulation unit 13 that executes simulation in accordance with an analysis result of the program, a time measurement unit 14 that measures time, an analysis data processing unit 15 that determines a call relationship of the program on the basis of analysis data, a programing support data creation unit 16 that creates programing support data including a call relationship and an execution time, and a data output unit 17 that outputs data such as the programing support data and a program to the numerical controller 200.

The analysis data processing unit 15 includes a call relationship determination unit 18 that determines a call relationship and a comment extraction unit 19 that extracts a comment.

The call relationship determination unit 18 determines a call of a subprogram and an end of a program by analyzing the program. Specifically, it analyzes the code of the program and detects a command that instructs the call of the subprogram. If a command calling the subprogram exists, the call relationship determination unit 18 notifies a call time record unit 21. During execution of the program, the call relationship determination unit 18 detects an end command of the program from analysis data of the program. If the end command of the program exists, it notifies to an execution time calculation unit 22. If the end command of the program exists, the call relationship determination unit 18 determines whether the simulation was being executed by the subprogram or the main program. If the main program ends, the call relationship determination unit 18 ends creating programing support data. The comment extraction unit 19 extracts a comment described in the program from the analysis data.

The comment explains what machining each program executes, such as "grooving", "roughing", "finishing", "boring", "drilling", and "tapping". An extracted comment occasionally includes an explanation not necessarily relevant to machining. In that case, the comment extraction unit extracts not all the comments but only some necessary comments. The comment is recorded in association with an ID of the program described later as illustrated in FIG. 3, for example. The comment may be associated with a program name. The comment is an element of programing support data.

The programing support data creation unit 16 includes a call relationship record unit 20 that records a call relationship in the programing support data, the call time record unit 21, the execution time calculation unit 22 that calculates the execution time of the program, and a comment record unit 23 that records comments.

Figure 4:
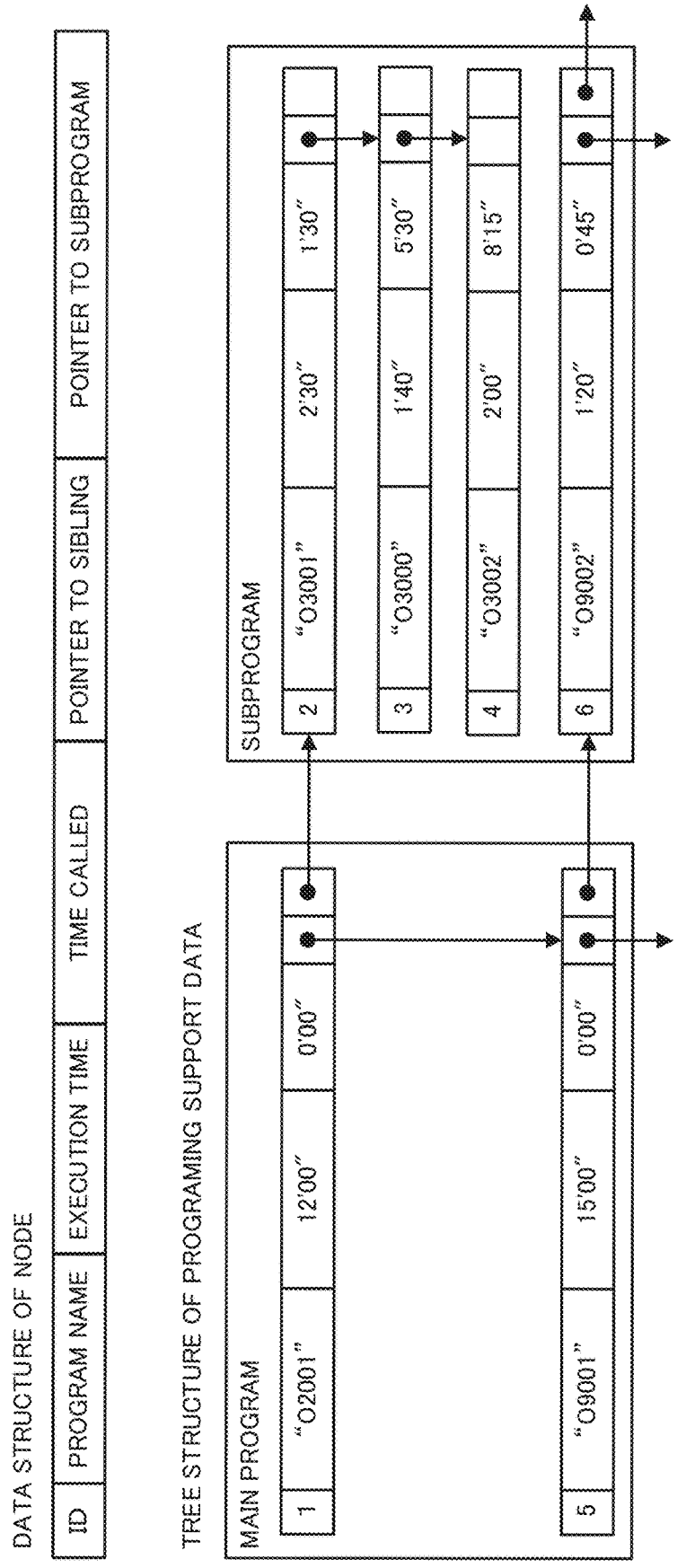
FIG. 4 is a view illustrating an example of programing support data.

When the call relationship determination unit 18 detects a call of a subprogram, the call relationship record unit 20 creates a new node in the programing support data. FIG. 4 is an example of the programing support data. The programing support data of FIG. 4 has a tree structure in which nodes are linked from parents to children. Each node is constituted with the ID of a program, a program name, a program execution time, a call time of the program, a pointer to a sibling program, and a pointer to a subprogram. The ID of the program indicates the execution order of the program. The pointer to the sibling program links the subprograms called from the same program. The sibling programs are linked in the execution order of the program. In FIG. 4, the pointer to the sibling program illustrated as downward arrows. In the programing support data of FIG. 4, the ID of the program indicates the execution order of the program, the pointer to the subprogram indicates the presence or absence of the subprogram, and the pointer to the sibling program indicates the subprogram of the same hierarchy called from the same program. That is, the programing support data records the call relationship of the program in a tree structure.

When the call relationship determination unit 18 detects a call of a subprogram, the call time record unit 21 records, in the node of the subprogram, the time when the subprogram is called.

When the call relationship determination unit 18 detects a call of a subprogram, the execution time calculation unit 22 acquires the time from the time measurement unit 14 and starts measuring the execution time of the called subprogram.

When the call relationship determination unit 18 detects the end of the subprogram, the execution time calculation unit 22 subtracts the time when the execution of the subprogram ended from the time when it was started, thereby calculating the execution time of the subprogram.

When the execution time of the subprogram is calculated, a call relationship record unit 20 records the execution time of the subprogram in the corresponding node of the programing support data.

The execution time calculation unit 22 calculates not only the execution time of the subprogram but also the execution time of the main program. When the end command of the program is detected, the execution time calculation unit 22 calculates the execution time of the program. In the case of the main program, the start time of the simulation is recorded as the "time of calling" the main program, and the execution time is calculated when the end command of the main program is detected.

Figure 5:
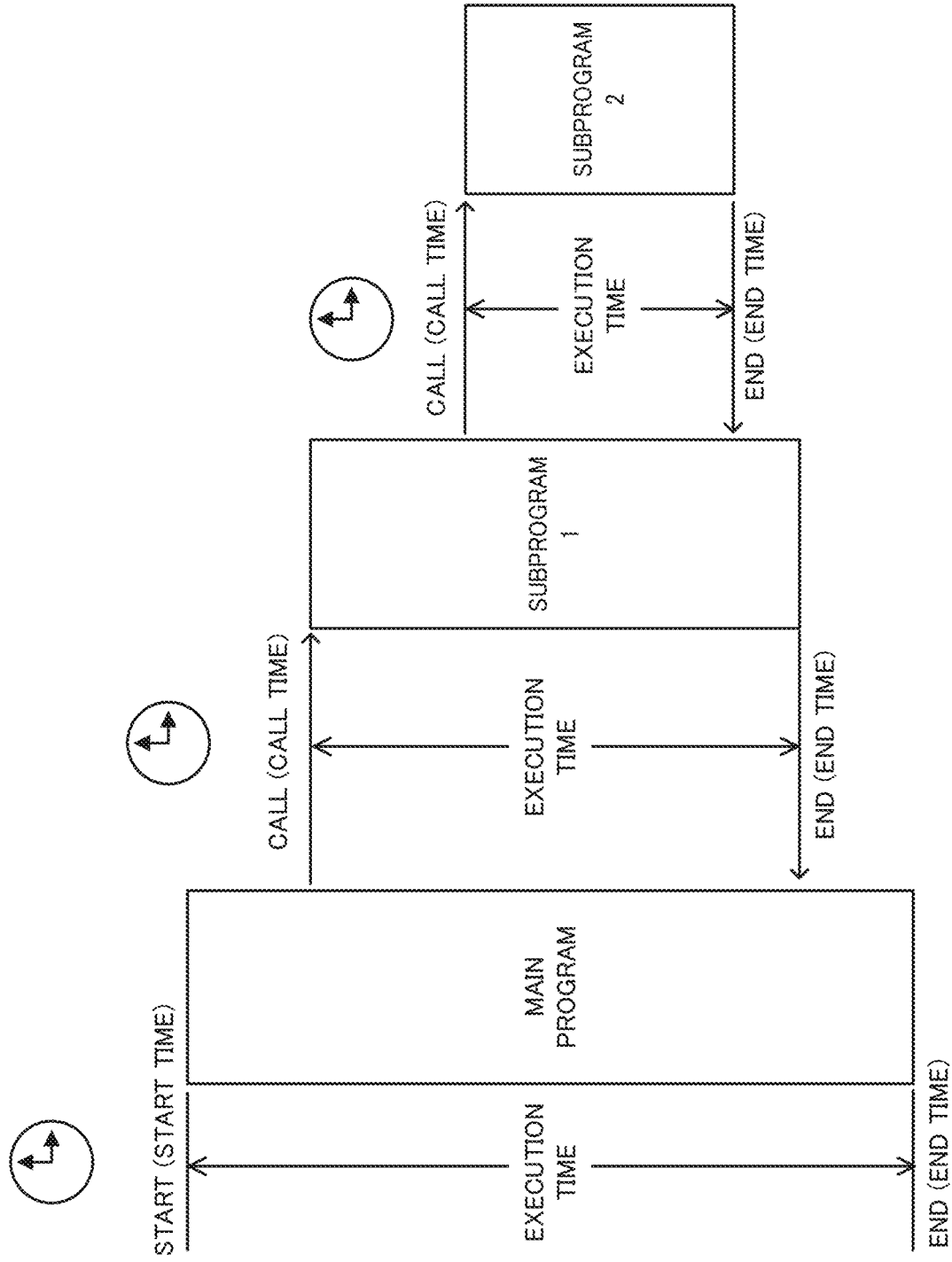
FIG. 5 is an example illustrating a calculation method of a program execution time.

Calculation of the execution time is performed in parallel by a plurality of programs as illustrated in FIG. 5. In the example of FIG. 5, the main program calls a subprogram 1, and the subprogram 1 calls a subprogram 2. When the main program calls the subprogram 1, the measurement of the execution time of the subprogram 1 is started, and when the subprogram 1 calls the subprogram 2, the measurement of the execution time of the subprogram 2 is started. When the end command of the subprogram 2 is detected, the execution time of the subprogram 2 is calculated, and when the end command of the subprogram 1 is detected, the execution time measurement of the subprogram 1 is calculated. When the end command of the main program is detected, the execution time of the main program is calculated. During execution of the subprogram 2, the execution time of the three programs of the main program, the subprogram 1, and the subprogram 2 is calculated in parallel. The execution time thus calculated is recorded as the programing support data.

The data output unit 17 outputs the programing support data to the numerical controller 200. The interface 115, a portable storage medium, or the like is used to output the programing support data.

Next, the configuration of the numerical controller 200 will be described. The numerical controller 200 includes a program storage unit 25 that stores a program, a programing support data storage unit 26 that stores programing support data, a display unit 27, an input unit 28, a programing support screen display processing unit 29 that displays programing support data on the display unit 27, and a program edit unit 30 that accepts editing of the program.

The program storage unit 25 stores a program for the numerical controller 200 to control an industrial machine (here, a machine tool). The machine tool performs a specific operation in accordance with the control of the numerical controller 200. The program controlling the machine tool is composed of a plurality of programs.

The plurality of programs have a call relationship.

The programing support data storage unit 26 stores the programing support data created with the personal computer 100. The programing support data storage unit 26 is not necessarily provided in the numerical controller 200, and may be stored in a portable storage medium, or may be configured to acquire, from the outside via the interface 115 through the network.

The programing support screen display processing unit 29 displays a programing support screen visualizing the call relationship of the program, the call time of the program, the execution time of the program, and the execution content of the program on the basis of the programing support data.

Figure 6:
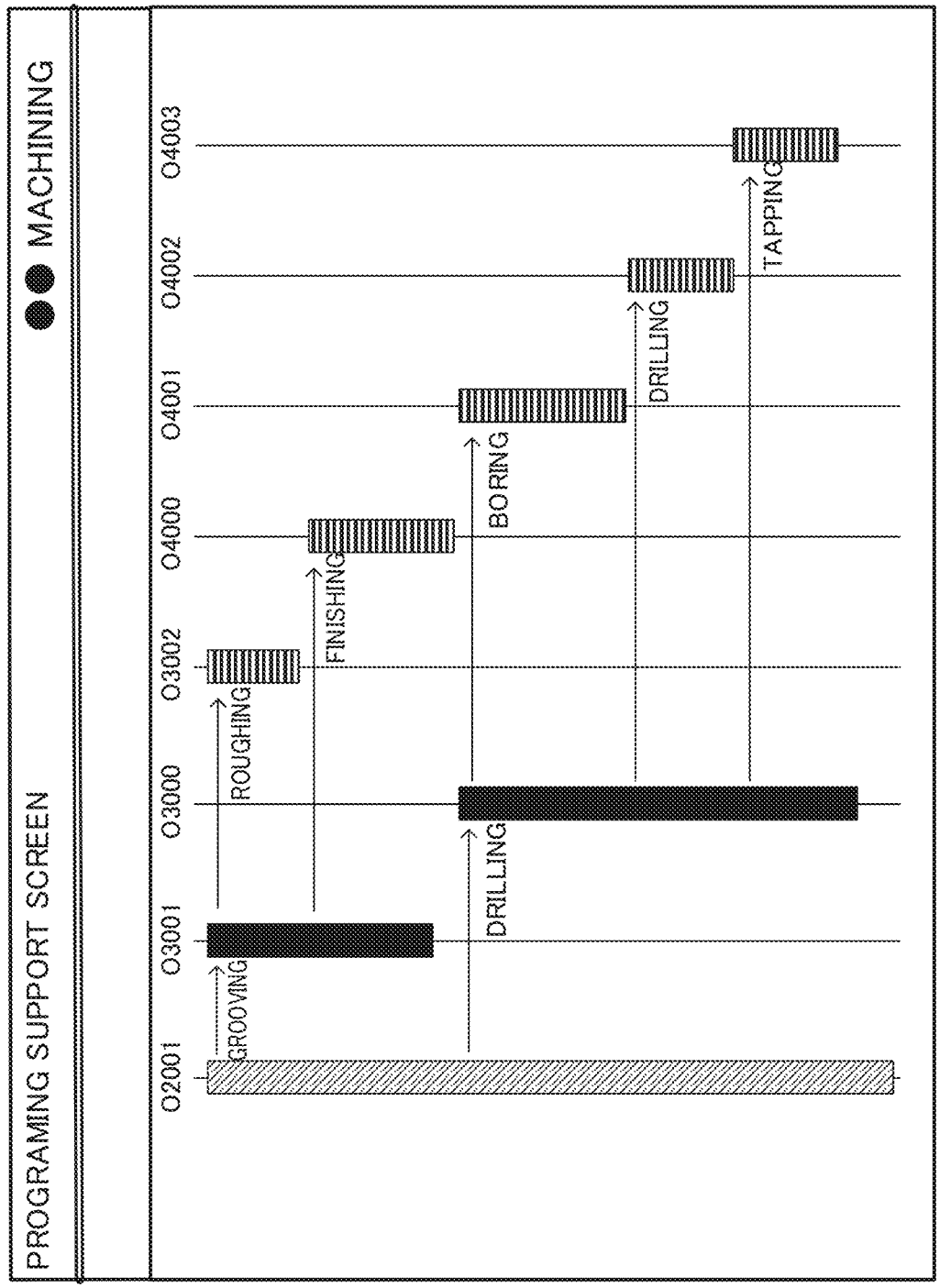
FIG. 6 is a view illustrating an example of a programing support screen.

FIG. 6 is an example of the programing support screen. The programing support screen of FIG. 6 has a configuration in which the vertical axis represents time and the horizontal axis represents the program name. The main program is displayed as a vertically long strip on the left end. A subprogram called from the main program is displayed as a vertically long strip on the right side of the main program. The program name is displayed at the top of the strip. The call relationship from a caller program to a callee program is indicated by an arrow. The position of the arrow indicates the time when the subprogram was called. Characters written in the comment are displayed below the arrow. In this example, the machining methods of the program such as "grooving" and "roughing" are displayed. In the example of FIG. 6, each program is displayed, but if numerous programs are difficult to display on a screen, a plurality of programs may be displayed collectively, or only some programs may be displayed.

The program edit unit 30 has a call program display unit 31 and a selection program display unit 32. When the user selects a part (arrow in the example of FIG. 6) indicating a call relationship on a programing support screen, the call program display unit 31 displays a program associated with the call relationship. The programs associated with the call relationship are a caller program and a callee program, for example. In addition, a part in which the call command is described may be displayed.

When the user selects the program, the selection program display unit 32 displays the selected program. The program edit unit 30 accepts the user's editing of the displayed program. The numerical controller 200 controls the machine tool in accordance with the edited program.

Figure 7:
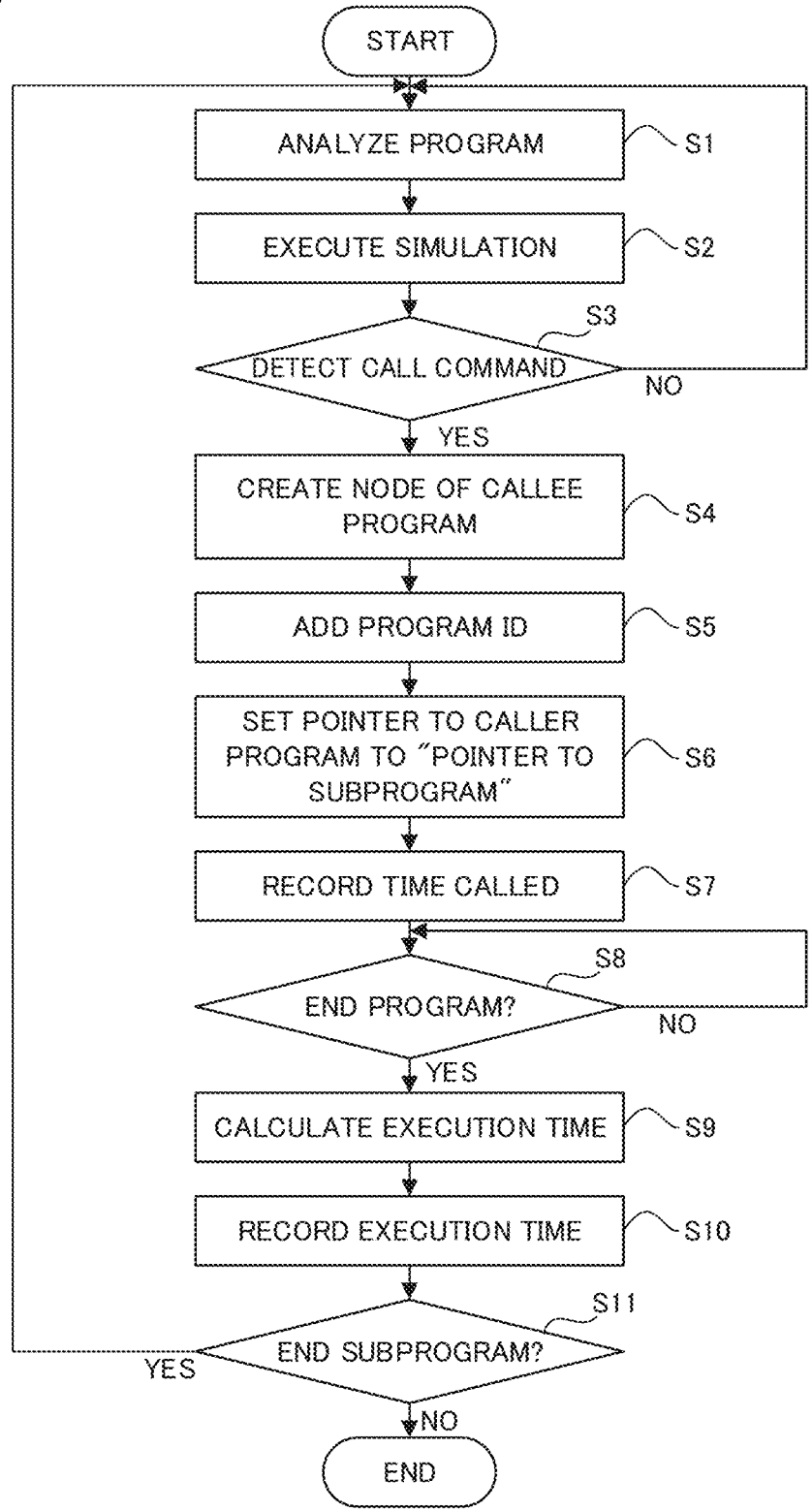
FIG. 7 is a chart illustrating a procedure of creating programing support data.

A procedure for the personal computer 100 to create the programing support data will be described with reference to FIG. 7. The program analysis unit 12 reads a program from the program storage unit 11 and analyzes the program (Step S1). The simulation unit 13 executes simulation in accordance with the analysis result of the program (Step S2). The analysis data processing unit 15 detects the call command of the subprogram on the basis of the analysis data of the program analysis unit 12. When the subprogram is called (Step S3; YES), the call relationship record unit 20 creates a node of the callee program (Step S4). Next, the call relationship record unit 20 adds 1 to the ID of the caller program to obtain the ID of the callee program (Step S5), and sets a pointer to the callee program as "Pointer to subprogram" of the node of the caller program (Step S6). The call time record unit 21 records, in "Time Called" of the node, the time when the program was called (Step S7).

The analysis data processing unit 15 detects an end command of the program. When the end command of the program is executed (Step S8; YES), the execution time calculation unit 22 calculates the execution time of the program from the difference between the current time and the time when the program was called (Step S9). The time is measured by the time measurement unit 14. The call relationship record unit 20 records the execution time of the program in the node (Step S10).

On the basis of the analysis data, the analysis data processing unit 15 determines whether or not it is the subprogram that ended the simulation. If it is the subprogram that ended the simulation (Step S11; YES), the processing returns to the caller program to continue the simulation (Step S1). If it is not the subprogram that ended the simulation (i.e., if the main program ended the simulation) (Step S11; NO), the process ends.

Figure 8:
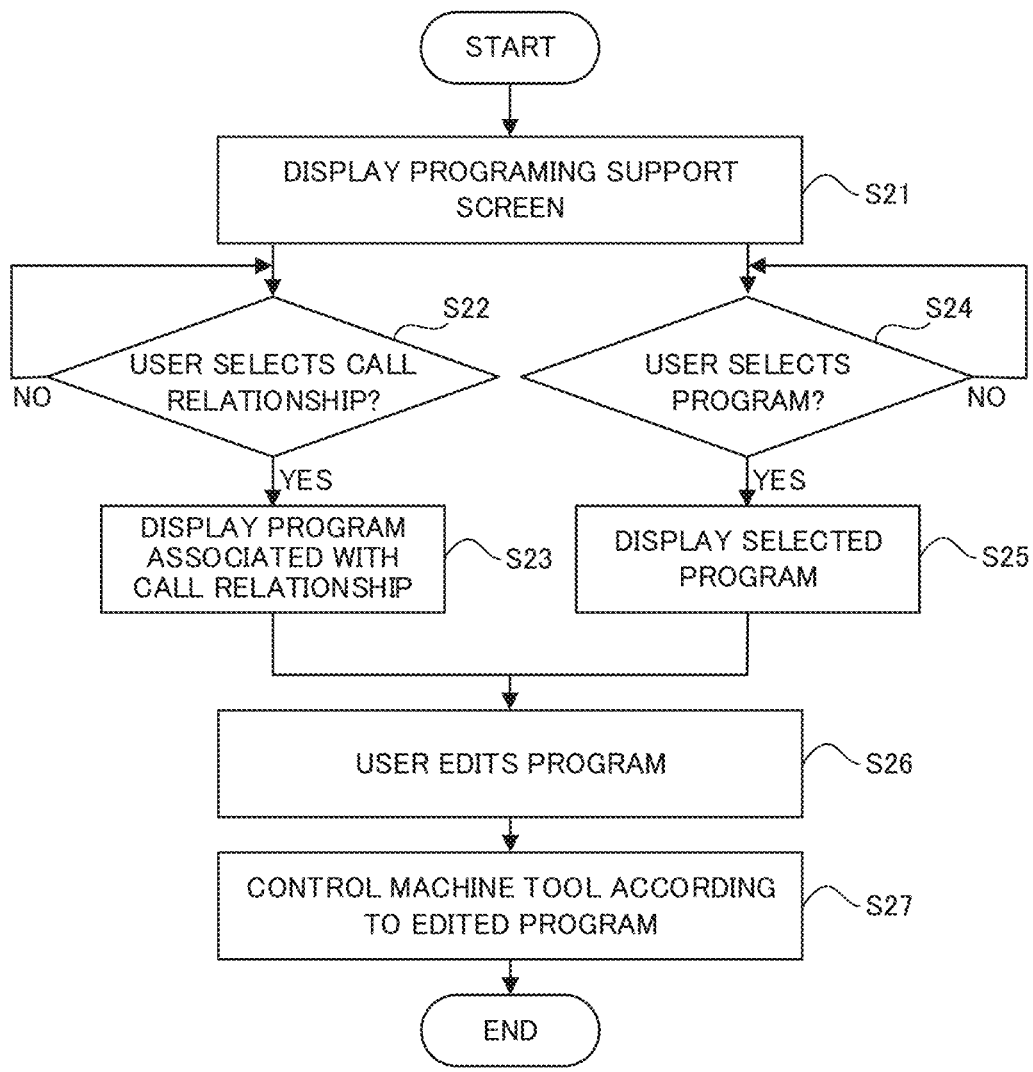
FIG. 8 is a chart explaining an operation of a numerical controller of an embodiment.

Next, the operation of the numerical controller 200 of the present embodiment will be described with reference to FIG. 8. First, the programing support screen display processing unit 29 displays the programing support screen on the display unit 27 (Step S21). The programing support screen displays, in a visually understandable form, the call relationship of the program, the call time of the program, the execution time of the program, the execution content of the program, and the execution order of the program.

While confirming the programing support screen, the user searches points in the program to be corrected. If wanting to confirm the program, the user selects a part of the screen with a finger, a mouse, a numeric keypad, or the like. If the user selects the call relationship (e.g., the arrow on the screen of FIG. 6) of the program (Step S22; YES), the call program display unit 31 displays, on the display unit 27, the program associated with the call relationship selected by the user, for example, the caller program and the callee program (Step S23). If the user does not select the call relationship (Step S22; NO), the numerical controller 200 waits for an instruction from the user.

If the user selects a program (Step S24; YES), the selection program display unit 32 displays the selected program on the display unit 27 (Step S25). If the user does not select a program (Step S24; NO), the numerical controller 200 waits for an instruction from the user. The program edit unit 30 accepts editing of the displayed program (Step S26). After editing the program, when the user instructs execution of the machine tool, the numerical controller 200 controls the machine tool in accordance with the edited program (Step S27).

The programing support system 300 creates a programing support data. Programing support data includes call relationship, execution time, call time, etc. The programing support system 300 acquires those pieces of information by analyzing the program being simulated and associating the call relationship with call time.

It is possible to create the programing support screen by using the programing support data, and visually express the call relationship, the call time, the execution time, and the execution content of the program. The outline and order of the machining performed by the program can be visually understood with the programing support screen.

In addition, the call relationship and call time of the program become clear. The correspondence relationship between the programs is visually expressed, and searching of the program desired to confirm the operation in the actual machine and the program needing editing becomes easy, which may reduce the time of the programing.

Furthermore, it becomes easy to find redundant parts of the program such as a location where a wrong direction is selected in a conditional branch, an incorrect macro variable, and repetition of the same program. The machining efficiency is improved by correcting the redundant parts.

Figure 9:
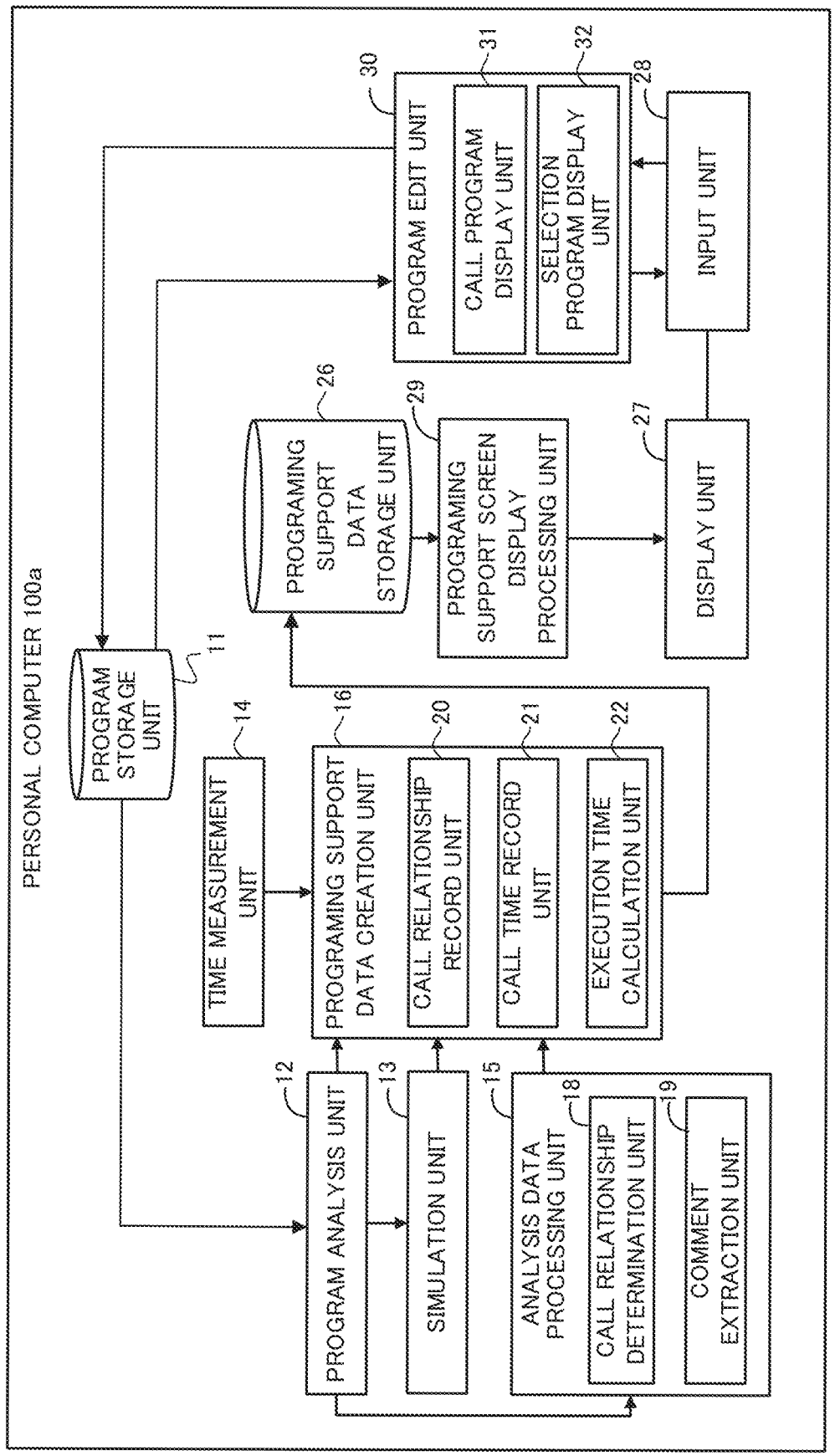
FIG. 9 is a block diagram of a personal computer of another embodiment.

Next, another embodiment will be described with reference to FIG. 9. In this embodiment, a personal computer 100a has all the functions of the programing support system 300. The personal computer 100a includes the program storage unit 11, the program analysis unit 12, the simulation unit 13, the time measurement unit 14, the analysis data processing unit 15, the programing support data creation unit 16, the call relationship determination unit 18, the comment extraction unit 19, the call relationship record unit 20, the call time record unit 21, the execution time calculation unit 22, the comment record unit 23, the display unit 27, the input unit 28, the programing support screen display processing unit 29, the program edit unit 30, the call program display unit 31, and the selection program display unit 32.

In this embodiment, the personal computer 100a performs simulation, creation of programing support data, display of the programing support screen, and edit of the program. Thus, the configuration of the programing support system is not limited to the above configuration, and functions may be distributed via the network.

The programing support system of the present embodiment is premised on the support of a programing for machine tool, but it may be applied to a programing for another industrial machine.

The invention claimed is:

1. A programing support device for an industrial machine that executes a plurality of programs having a call relationship and performs a specific operation, the programing support device comprising:
   a processor configured to
      analyze the plurality of programs,
      simulate an operation of the industrial machine in accordance with an analysis result,
      determine the call relationship of the plurality of programs being simulated,
      determine a call time of the plurality of programs being simulated,
      create programing support data in which the call relationship of the plurality of programs and the call time of the plurality of programs are associated, and
      cause a display to display, along a time axis and based on the programing support data, a programing support screen indicating the call relationship of the plurality of programs and the call time of the plurality of programs, wherein
   the plurality of programs includes a main program, a subprogram called by the main program, and a further subprogram called by the subprogram, and
   the call relationship includes a relationship among the main program, the subprogram, and the further subprogram.

2. The programing support device according to claim 1, wherein
   the processor is configured to
      calculate an execution time of the plurality of programs executed in a simulation, and
      record the call relationship of the plurality of programs, the call time of the plurality of programs, and the execution time of the plurality of programs in association with one another.

3. The programing support device according to claim 1, wherein
   the processor is configured to
      extract comments described in the plurality of programs, and
      record the call relationship of the plurality of programs, the call time of the plurality of programs, and the comments extracted from the plurality of programs in association with one another.

4. The programing support device according to claim 2, wherein
   the processor is further configured to cause the display to display, along the time axis, the programing support screen that indicates the call relationship of the plurality of programs, the call time of the plurality of programs, and the execution time of the plurality of programs.

5. The programing support device according to claim 3, wherein
   the processor is further configured to cause the display to display, along the time axis, the call relationship of the plurality of programs, the call time of the plurality of programs, and some or all of the comments extracted from the plurality of programs.

6. The programing support device according to claim 1, wherein
   the processor is configured to
      accept a selection for the call relationship of the plurality of programs displayed on the programing support screen,
      cause the display to display programs of the plurality of programs associated with a selected call relationship, and
      accept editing of the displayed programs of the plurality of programs.

7. The programing support device according to claim 1, wherein
   the processor is configured to
      accept a selection for programs of the plurality of programs displayed on the programing support screen,
      cause the display to display the selected programs of the plurality of programs, and
      accept editing of the displayed programs of the plurality of programs.

8. The programing support device according to claim 1, wherein
   the programing support screen includes
      a vertical axis representing the time axis,
      a horizontal axis representing program names of the plurality of programs,
      the main program displayed as a first vertical strip, and
      the subprogram and the further subprogram displayed as second and third vertical strips adjacent to the first vertical strip.

9. The programing support device according to claim 1, wherein
   the programing support screen includes an arrow indicating the call relationship of the plurality of programs wherein a position of the arrow indicates the call time of the plurality of programs.

10. A programing support system for an industrial machine that executes a plurality of programs having a call relationship and performs specific processing, the programing support system, comprising:
   a processor configured to
      analyze the plurality of programs,
      simulate an operation of the industrial machine in accordance with an analysis result,
      determine the call relationship of the plurality of programs being simulated,
      calculate a call time of the plurality of programs being simulated,
      create programing support data in which the call relationship of the plurality of programs and the call time of the plurality of programs are associated, and
      cause a display to display, along a time axis and based on the programing support data, a programing support screen indicating the call relationship of the plurality of programs and the call time of the plurality of programs, wherein the plurality of programs includes a main program, a subprogram called by the main program, and a further subprogram called by the subprogram, and the call relationship includes a relationship among the main program, the subprogram, and the further subprogram.

11. The programing support system according to claim 10, wherein the programing support screen includes
- a vertical axis representing the time axis,
- a horizontal axis representing program names of the plurality of programs,
- the main program displayed as a first vertical strip, and
- the subprogram and the further subprogram displayed as second and third vertical strips adjacent to the first vertical strip.

12. The programing support system according to claim 10, wherein the programing support screen includes an arrow indicating the call relationship of the plurality of programs wherein a position of the arrow indicates the call time of the plurality of programs.

13. A programing support method for an industrial machine that executes a plurality of programs having a call relationship and performs specific processing, the programing support method, comprising:

analyzing the plurality of programs;

performing simulation of an operation of the industrial machine in accordance with an analysis result;

determining the call relationship of the plurality of programs being simulated;

calculating a call time of the plurality of programs being simulated;

creating programing support data in which the call relationship of the plurality of programs and the call time of the plurality of programs are associated;

on the basis of the programing support data, along a time axis, creating a programing support screen that indicates the call relationship of the plurality of programs, the call time of the plurality of programs, and an execution time of the plurality of programs; and displaying the programing support screen, wherein the plurality of programs includes a main program, a subprogram called by the main program, and a further subprogram called by the subprogram, and the call relationship includes a relationship among the main program, the subprogram, and the further subprogram.

14. The programing support method according to claim 13, wherein the programing support screen includes
- a vertical axis representing the time axis,
- a horizontal axis representing program names of the plurality of programs,
- the main program displayed as a first vertical strip, and
- the subprogram and the further subprogram displayed as second and third vertical strips adjacent to the first vertical strip.

15. The programing support method according to claim 13, wherein the programing support screen includes an arrow indicating the call relationship of the plurality of programs wherein a position of the arrow indicates the call time of the plurality of programs.

* * * * *